(12) United States Patent
Jamal et al.

(10) Patent No.: US 7,068,094 B1
(45) Date of Patent: Jun. 27, 2006

(54) CHARGE-PUMP CURRENT SOURCE

(75) Inventors: Shafiq M. Jamal, Gilroy, CA (US);
Pierte Roo, Mountain View, CA (US)

(73) Assignee: Marvell International Ltd. (BM)

( * ) Notice: Subject to any disclaimer, the term of this patent is extended or adjusted under 35 U.S.C. 154(b) by 0 days.

(21) Appl. No.: 10/802,364

(22) Filed: Mar. 16, 2004

(51) Int. Cl.
*G05F 1/10* (2006.01)

(52) U.S. Cl. ............... 327/541; 327/536; 327/543

(58) Field of Classification Search ............. 327/530, 327/534, 535, 536, 538, 540, 541, 543
See application file for complete search history.

(56) References Cited

U.S. PATENT DOCUMENTS

| | | | | |
|---|---|---|---|---|
| 5,767,735 A | * | 6/1998 | Javanifard et al. | 327/536 |
| 6,208,198 B1 | * | 3/2001 | Lee | 327/536 |
| 6,535,435 B1 | * | 3/2003 | Tanaka et al. | 365/189.09 |
| 6,628,252 B1 | * | 9/2003 | Hoshino et al. | 345/82 |
| 6,639,373 B1 | * | 10/2003 | Knight et al. | 318/500 |
| 6,775,344 B1 | * | 8/2004 | Buhler et al. | 375/376 |
| 6,812,754 B1 | * | 11/2004 | Nakanishi | 327/157 |
| 6,856,204 B1 | | 2/2005 | Kwon | |

OTHER PUBLICATIONS

IEEE Computer Society, "*IEEE Standard for Information Technology — Telecommunications and Information Exchange Between Systems — Local and Metropolitan Area Networks — Specific Requirements — Part 3: Carrier Sense Multiple Access with Collision Detection (CSMA/CD) Access Method and Physical Layer Specifications*", IEEE Std 802.3 — 2002.

* cited by examiner

*Primary Examiner*—Jeffrey Zweizig

(57) ABSTRACT

Systems, methods and apparatus relating to electronic circuits and signal processing are provided. In one aspect, a circuit is provided that includes a charge-pump operable to supply an output voltage, and a current mirror in communication with the charge-pump. The current mirror is responsive to the output voltage of the charge pump, and is operable to output a relatively constant current and suppress noise from the output voltage.

60 Claims, 8 Drawing Sheets

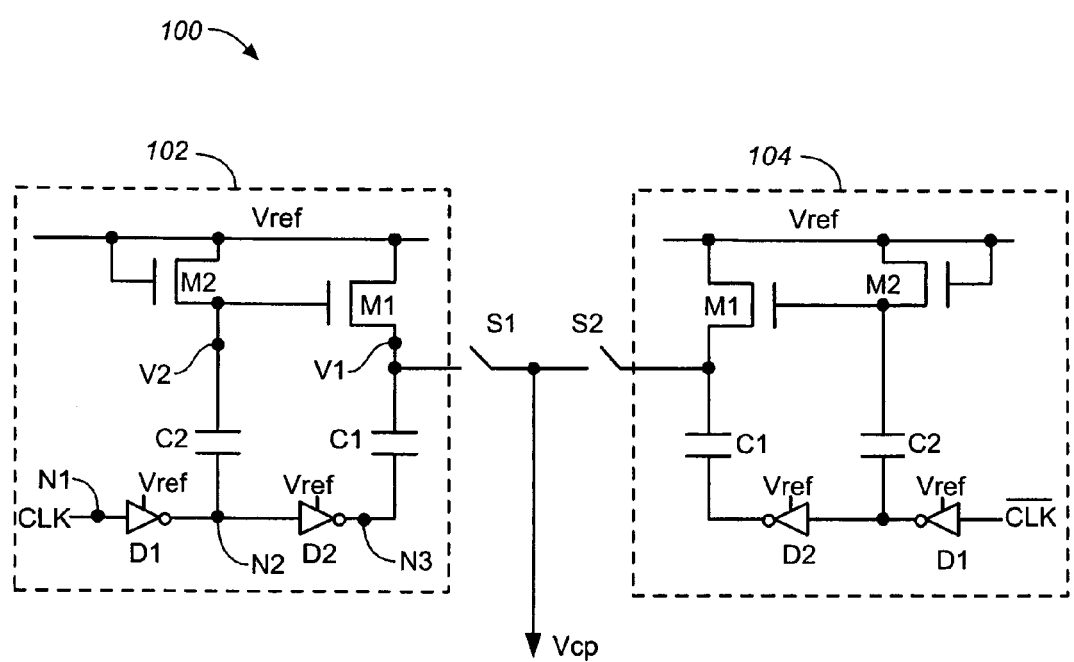
FIG._1
(PRIOR ART)

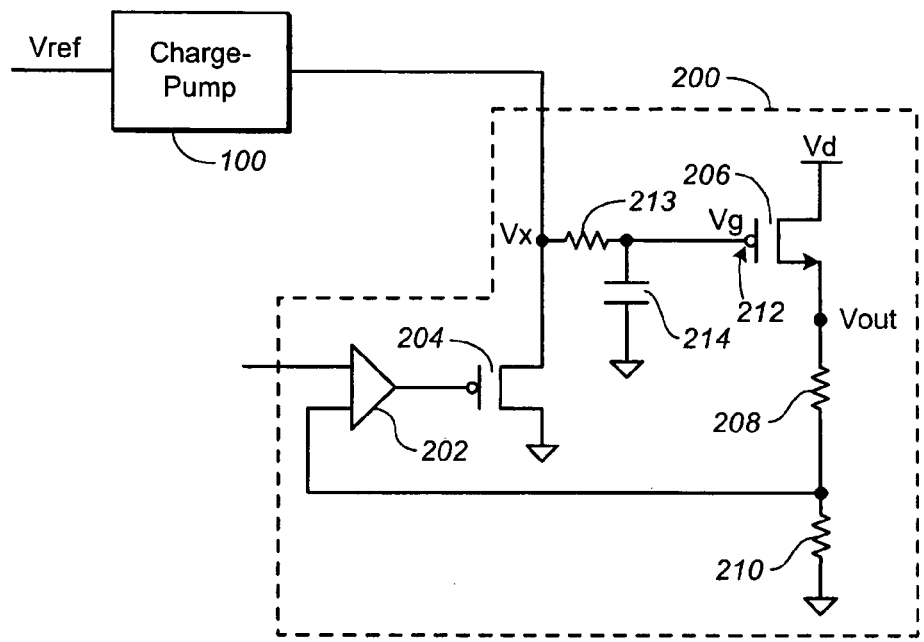
FIG._2
*(PRIOR ART)*
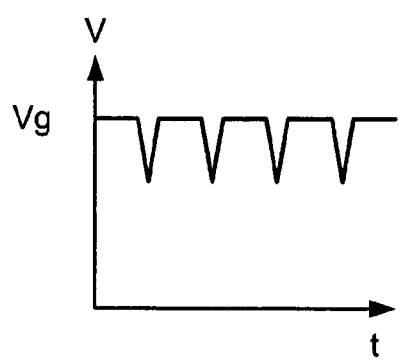
FIG._3a
*(PRIOR ART)*
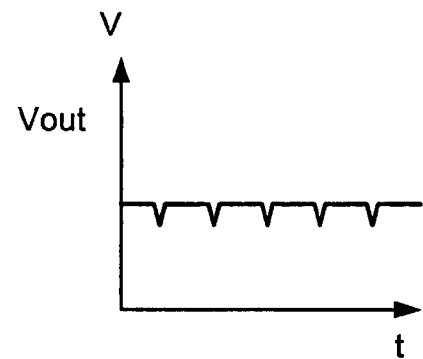
FIG._3b
*(PRIOR ART)*

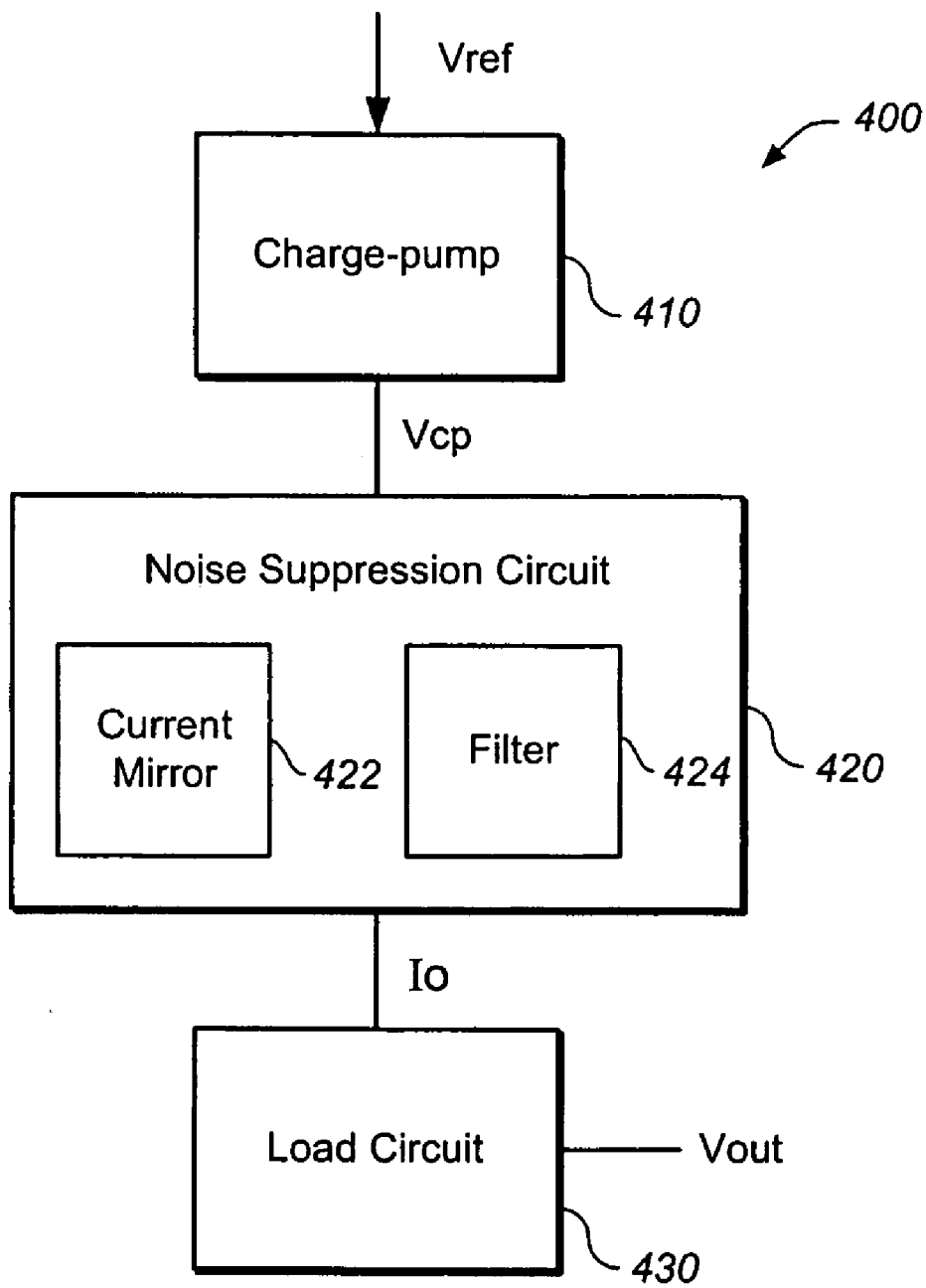
FIG._4

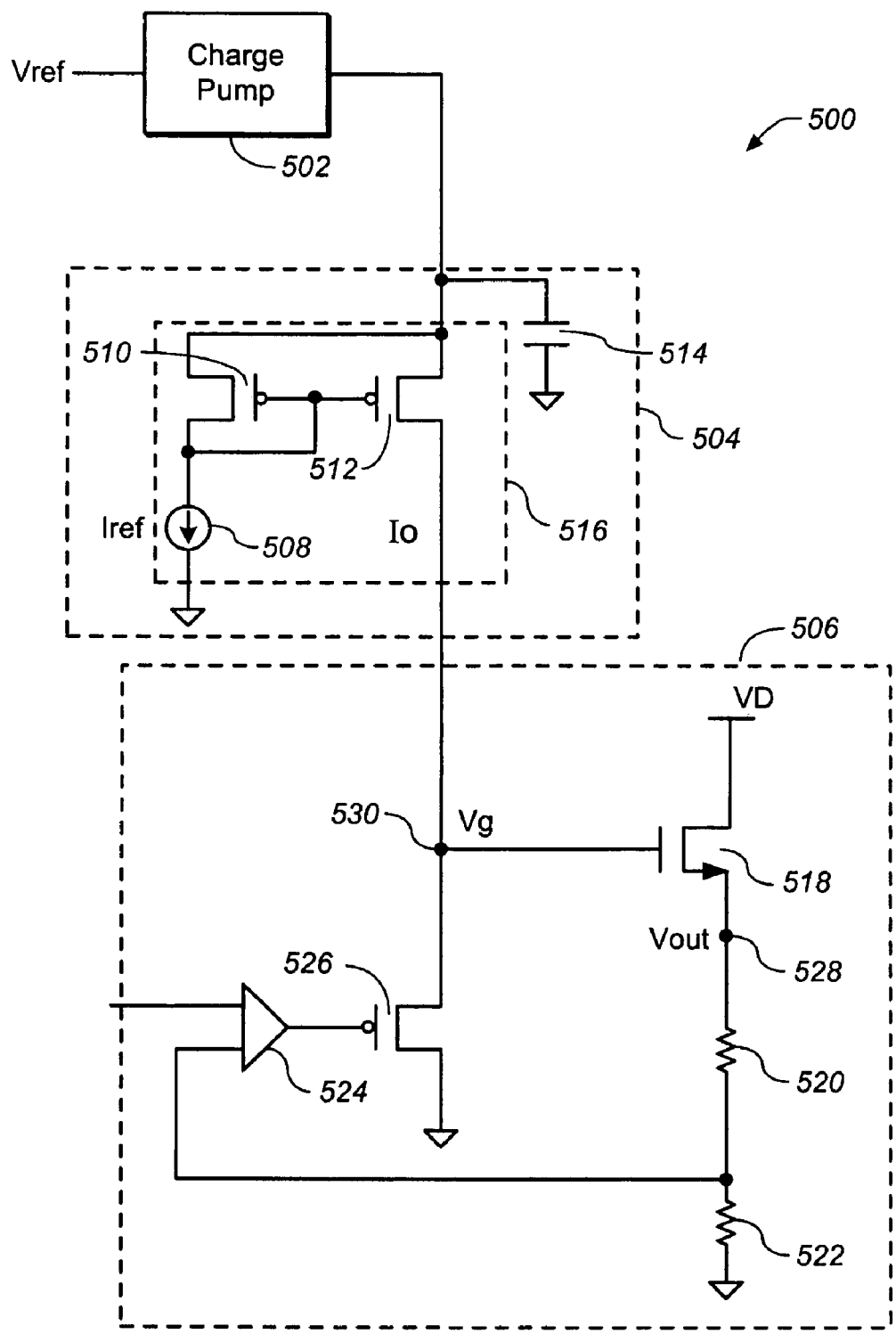
FIG._5

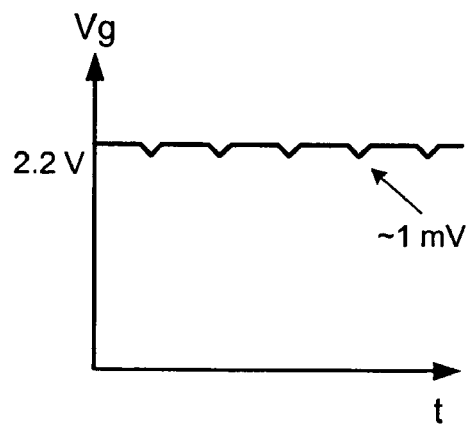
FIG._6a
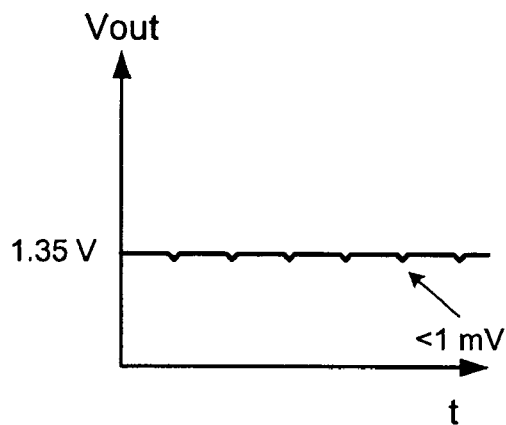
FIG._6c
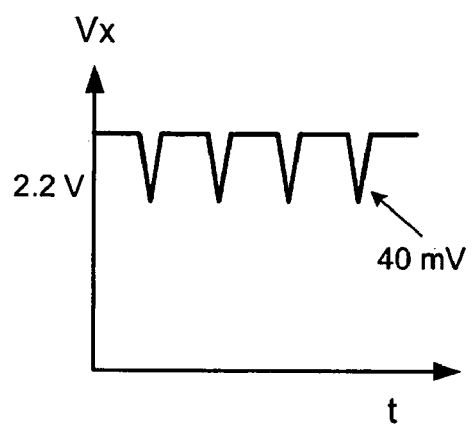
FIG._6b
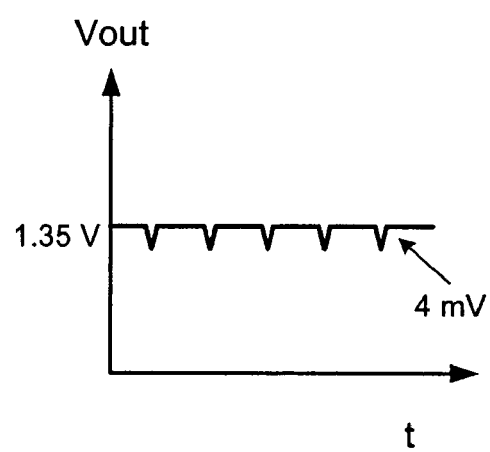
FIG._6d

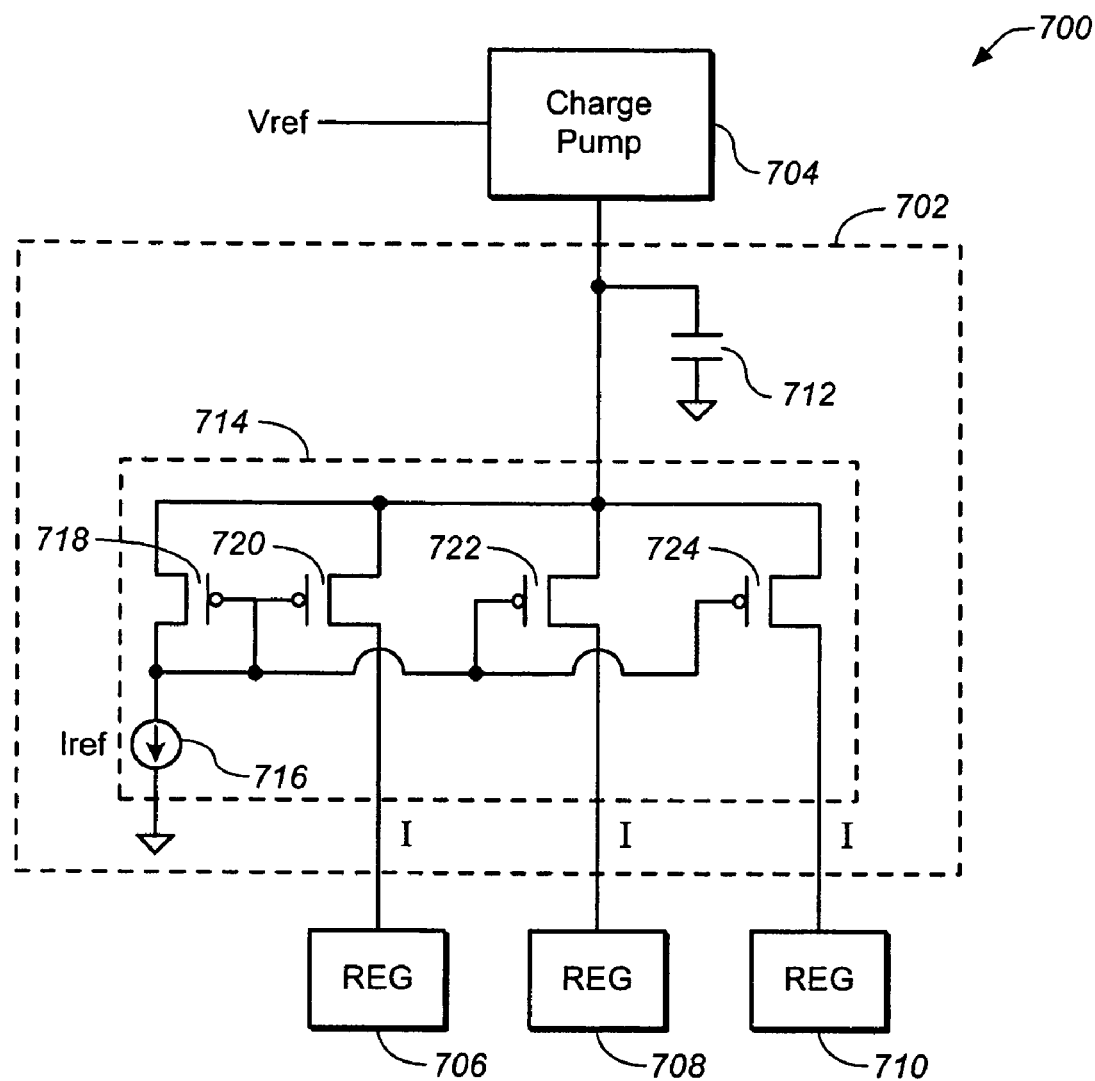
FIG._7

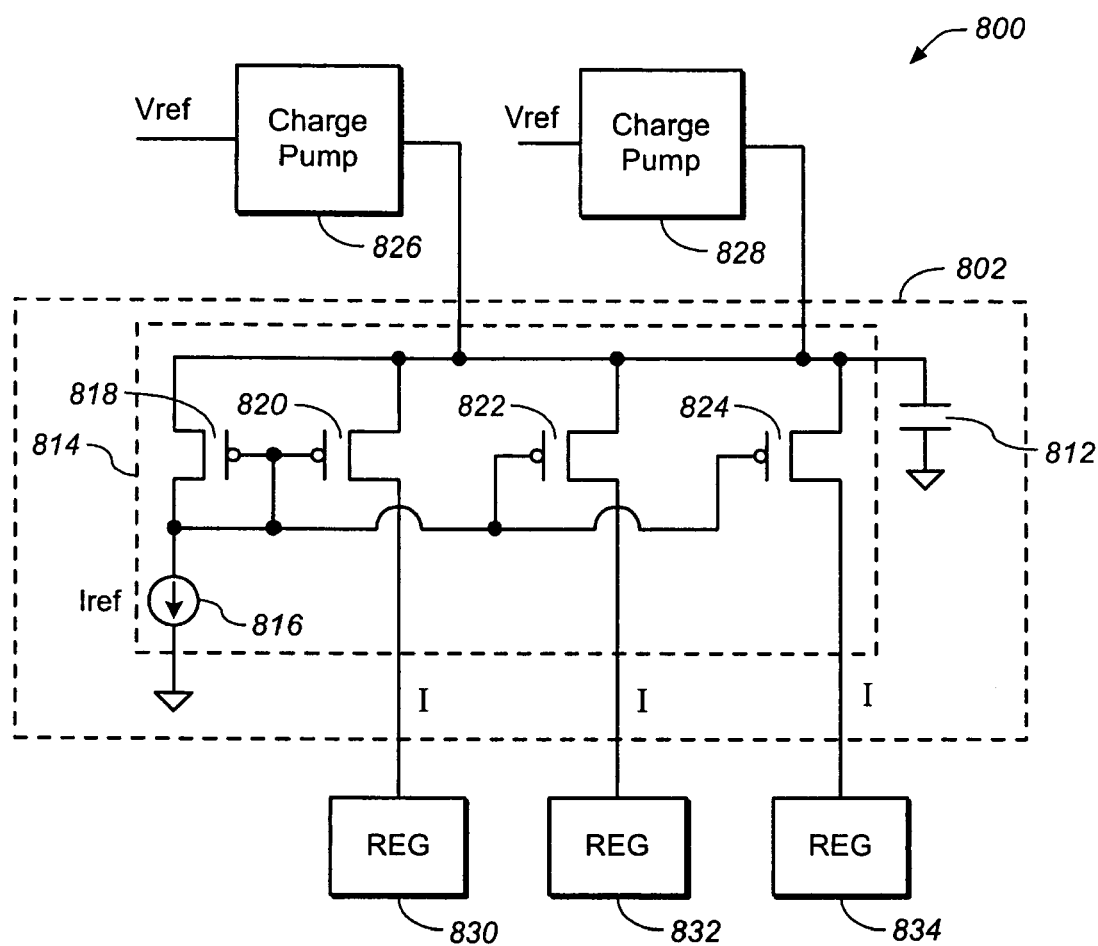
FIG._8

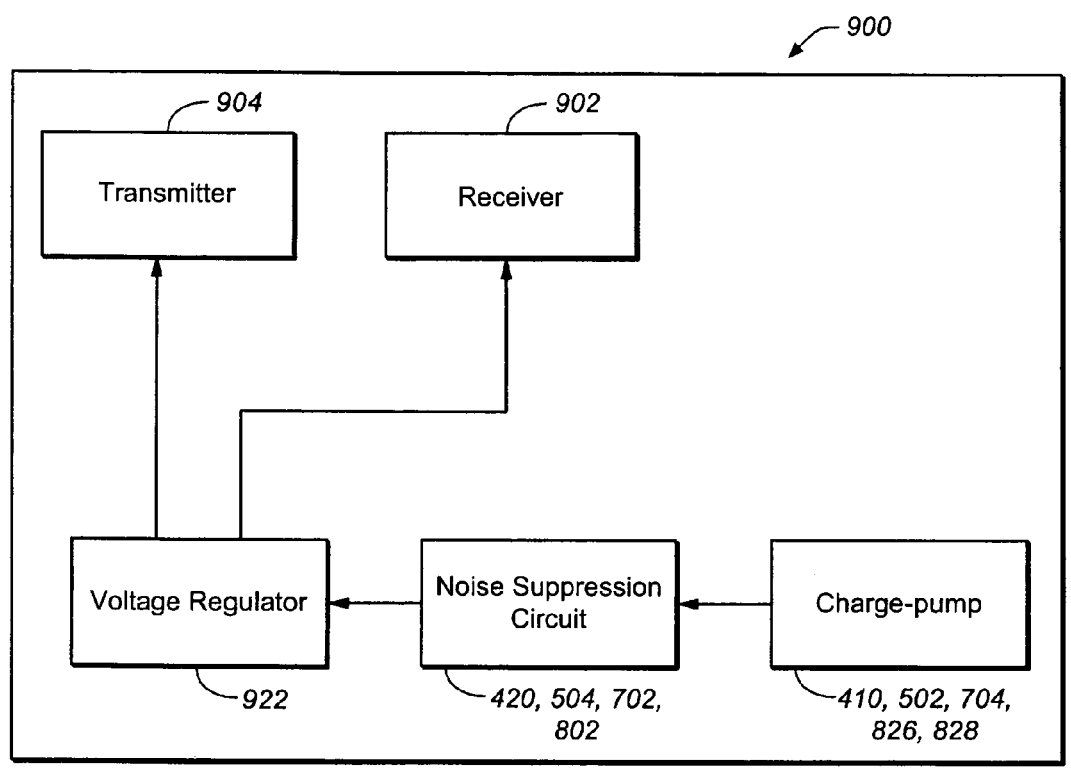
FIG._9

CHARGE-PUMP CURRENT SOURCE

BACKGROUND

The following disclosure relates to electrical circuits and signal processing.

A charge-pump is a useful circuit for a variety of applications. A charge-pump receives a reference voltage input and provides an output voltage to a load circuit of that is a multiple (integer or non-integer) of the reference voltage. A charge-pump can be useful in many types of circuits, for example, a charge-pump can be used as a source for a voltage regulator loop. The voltage regulator loop can operate to provide a consistent desired output voltage over changes in process, voltage, and temperature ("PVT").

FIG. 1 illustrates a conventional charge-pump 100. Charge-pump 100 includes two identical mirror circuits 102 and 104 connected to output Vcp by two switches S1 and S2. The mirror circuits 102 and 104 provide a step-up voltage to the output Vcp in alternate cycles provided by clocks CLK. Typically, the mirror circuits 102 and 104 are designed to provide a step-up of substantially twice a reference voltage, Vref. Specifically, mirror circuit 102 includes clock controlled digital logic inverters D1 and D2 supplied by Vref, capacitors C1 and C2, and transistors M1 and M2 defining nodes N1, N2, and N3.

When the clock CLK provides a logical 1 signal at node N1, node N2 falls to a logical 0 (due to inverter D1) while node 3 rises to a digital 1 (due to inverter D2 inverting the logical zero output from inverter D1). The inverters D1, D2 are supplied by Vref so that when either output is a logical 1, the output voltage from the respective inverter is Vref. In the example above (CLK providing a logical 1 at node N1), node 3 rises to a voltage value of Vref. Since the value of node 2 is zero, the voltage at point V2 decreases causing transistor M2 to cut off. The resulting voltage at V1 consequently increases to substantially 2Vref. When the clock cycles so that node N1 transitions to a logical 0, V2 continues to bias transistor m1, resulting in an output at node V1 equal to Vref. Switch, S1, can be disconnected from output Vcp when V2 does not equal 2Vref. The mirror circuits 102 and 104 are designed with complementary clock cycles that alternate output voltages of substantially 2Vref in order to provide dual cycle pumping at a near constant supply of 2Vref to output Vcp.

Typically, the input voltage to charge-pump 100 is a constant Direct Current ("DC") source Vref. The output voltage, Vcp, is typically substantially double Vref. However, in a conventional charge-pump the voltage characteristic of Vcp over time is not smooth. Small deviations in the output Vcp can occur as a result of the alternating clock signals. Voltage ripples, or noise, typically occur at a regular period related to the frequency of the clock cycles of the charge-pump. This voltage noise can be significant enough to interfere with circuit functions.

FIG. 2 shows a conventional application of a charge-pump 100 as a source for a voltage regulator loop 200. Voltage regulator loop 200 includes a feedback loop that works to maintain a constant output. Voltage regulator loop 200 includes amplifier 202, transistors 204 and 206, and resistors 208, 210 and 213. Charge-pump 100 provides a voltage to gate 212 of transistor 206, which activates transistor 206. The gate voltage is designed to bias transistor 206 such that transistor 206 provides a desired output, Vout. If, for example, the output Vout decreases, the feedback loop operates to increase the gate voltage in order to restore the desired output Vout. The noise inherent in the charge-pump output can interfere with the functioning of transistor 206 and result in instability of the regulator loop 200. For example, large fluctuations in the voltage characteristic can cause transistor 206 to deactivate, shutting down the voltage regulator loop 200. Additionally, Vref and charge-pump 100 can be susceptible to fluctuations over PVT, causing further variability at gate 212 of transistor 206.

One method of reducing the effect of the voltage noise is to insert a filter into the regulator loop 200. One typically used filter is a bypass capacitor 214. The bypass capacitor 214 works to establish an AC ground in a given circuit. The bypass capacitor 214 suppresses the AC component of the output signal. The larger the bypass capacitor 214 the greater the ripple that can be suppressed. However, circuit limitations can prevent the use of large bypass capacitors 214. For example, since the bypass capacitor 214 is located within the voltage regulator loop 200, the bypass capacitor 214 changes the loop dynamic. Large capacitance values of bypass capacitor 214 can interfere with the operation of the voltage loop 200 leading to circuit instability.

FIGS. 3a and 3b illustrate the voltage noise at the gate of transistor 206 and the output voltage, Vout, for the voltage regulator loop 200, respectively. Bypass capacitor 214 reduces the magnitude of the noise, however significant voltage ripple can remain at gate 112 which can cause stability problems with other circuits connected to the voltage regulator loop 200 as well as impact the feedback loop of the voltage regulator.

SUMMARY

Systems and techniques relating to electronic circuits and signal processing. In general, in one aspect, a circuit is provided that includes a charge-pump operable to supply an output voltage, and a current mirror responsive to the output voltage, and operable to output a relatively constant current and suppress noise from the output voltage.

In general, in another aspect, a circuit is provided that includes means for supplying an output voltage and suppression means for suppressing noise from the supplied output voltage including converting the supplied output voltage into a relatively constant current.

In general, in another aspect, a method is provided for suppressing noise. The method includes providing an output voltage having an associated noise component, and suppressing the noise component in the output voltage including supplying a relatively constant current in response to the output voltage.

In general, in another aspect, an Ethernet transceiver is provided that includes a transmitter, a receiver, a charge-pump, a current mirror, and a voltage regulator. The charge-pump is operable to supply a reference voltage to the current mirror. The current mirror is arranged between the charge-pump and the voltage regulator. The current mirror is operable to provide a relatively constant current to the voltage regulator, and suppress noise from the charge-pump. The voltage regulator is further in communication with at least one of the transmitter and the receiver. The voltage regulator is operable to convert the relatively constant current source into a constant reference voltage, and supply the constant reference voltage to at least one of the transmitter and the receiver.

Implementations may include one or more of the following features. The circuit can further include a filter arranged between the charge-pump and the current mirror. The filter can be operable to further suppress noise from the output voltage of the charge-pump. The current mirror can isolate the filter from the load circuit. The filter can include a bypass capacitance. The bypass capacitance can be a bypass capacitor. The load circuit can include a regulator loop operable to generate a consistent output voltage. The load circuit can include a voltage reference generator operable to generate a reference voltage. The load circuit can include a voltage controlled oscillator operable to generate an output signal having a pre-determined oscillation frequency. The current mirror can be operable to reject variations in the output voltage of the charge-pump.

The circuit can further include a plurality of charge-pumps each in communication with the current mirror. The current mirror can be operable to suppress noise from an output voltage of the plurality of charge-pumps. The current mirror can be operable to reject variations in the output voltage of the plurality of charge-pumps. The circuit can further comprise one or more filters arranged between the plurality of charge-pumps and the current mirror. The one or more filters can be operable to suppress noise from an output voltage of the plurality of charge-pumps. At least one of the one or more filters can include a bypass capacitor.

The circuit can further include a plurality of current mirrors in communication with a plurality of load circuits. Each current mirror can be operable to provide a constant current to a corresponding load circuit and suppress noise from an output voltage of a corresponding charge-pump. At least one of the plurality of load circuits can include a regulator loop. At least one of the plurality of load circuits can include a voltage reference generator. At least one of the plurality of load circuits can include a voltage controlled oscillator. The circuit can further include a filtering means for further suppressing noise from the supplied output voltage. The Ethernet transceiver can be compliant with IEEE 1000BaseT.

Implementations may provide one or more of the following advantages. A noise suppression circuit is provided that can suppress noise from a voltage supply, for example a charge-pump. The noise suppression circuit can provide noise suppression for any load circuit that requires a constant current input, such as a voltage regulator loop, voltage reference generator, or voltage controlled oscillator. The current mirror is designed to maintain a relatively constant current output over PVT. Circuit stability is further increased by maintaining a constant current over PVT. By maintaining a constant current output, the current mirror further reduces noise across the current mirror. Circuit noise is reduced by the current mirror because the current mirror provides rejections to voltage variations in order to maintain the constant current. The current mirror also functions to isolate a filter, such as a bypass capacitor from the load circuit, effectively decoupling the filter from the load circuit. In one example, a noise suppression circuit is provided that includes a current mirror that isolates a filter from a voltage regulator loop, which enhances loop stability. Removing the bypass capacitor from the voltage regulator loop allows for the use of a larger capacitance value without impacting the voltage regulator loop function.

The details of one or more implementations are set forth in the accompanying drawings and the description below. Other features and advantages may be apparent from the description and drawings, and from the claims.

DRAWING DESCRIPTIONS

These and other aspects will now be described in detail with reference to the following drawings.

FIG. 1 is a schematic diagram of a conventional charge-pump.

FIG. 2 is a schematic diagram of a conventional voltage regulator loop with a charge-pump.

FIGS. 3a–b are voltage graphs of a conventional voltage regulator loop supplied by a charge-pump.

FIG. 4 is a block diagram of a noise suppression circuit positioned between a charge-pump and a voltage regulator loop.

FIG. 5 is a schematic diagram of a circuit including a charge-pump, noise suppression circuit, and a voltage regulator loop.

FIGS. 6a–d are voltage graphs of a voltage regulator loop connected to a noise suppression circuit.

FIG. 7 is a schematic diagram of charge-pump, noise suppression circuit, and multiple voltage regulator loops circuit.

FIG. 8 is a schematic diagram of a multiple charge-pump, noise suppression circuit, and multiple voltage regulator loops circuit.

FIG. 9 is a block diagram of an Ethernet transceiver.

Like reference symbols in the various drawings indicate like elements.

DETAILED DESCRIPTION

FIG. 4 shows a block diagram of a charge-pump current mirror system 400 operable to reduce voltage ripple in a load circuit. Charge-pump 410 is operable to provide a source voltage to a load circuit 430. The charge-pump 410 can be, for example, the charge-pump 100 as described with respect to FIG. 1 above. In one implementation, charge-pump 100 receives an input voltage Vref and produces an output voltage Vcp of substantially twice the input voltage Vref. A noise suppression circuit 420 positioned between the charge-pump 410 and the load circuit 420 is operable to suppress voltage ripple from the charge-pump 410 without interfering with the stability and function of the load circuit 430. In one implementation, noise suppression circuit 420 includes a current mirror 422 and a filter 424 such as a bypass capacitor. The current mirror 422 operates to isolate the filter 424 from load circuit 430 allowing, for example, the use of a large bypass capacitor without impairing the functionality of load circuit 430. In one implementation, noise suppression circuit 420 is operable to provide a relatively constant current Io to allow proper functioning of load circuit 430. One example of load circuit 430 is a voltage regulator loop providing a constant output Vout.

FIG. 5 illustrates a noise suppression circuit 504 in a circuit 500 including a charge-pump 502 and a voltage regulator loop 506. Noise suppression circuit 504 includes current source 508 and transistors 510 and 512, which are operable to provide a current mirror 516. Noise suppression circuit 504 also includes a filter such as bypass capacitor 514. Current mirror 516 is operable to provide a constant current, Io, to voltage regulator loop 506 and to reduce the voltage noise from the output of charge-pump 502. Current mirror 516 provides a constant current output, Io, which works to reject noise from charge-pump 502. The size of the current source depends on the current requirements of the load circuit.

In one implementation, the total mirror current, Io, provided to the load circuit is equal to or less than the current provided by the charge-pump 502. Bypass capacitor 514 operates, as described above, to suppress the voltage noise inherent in charge-pump 502. The size of bypass capacitor 514 can be selected based on the magnitude of noise rejection provided by the current mirror. Because bypass capacitor 514 is located outside of the voltage regulator loop 506, the capacitance value of the bypass capacitor 514 can be increased without significantly impacting the operation of voltage regulator loop 506.

The input reference voltage, Vref, to the charge-pump 502 is sensitive to variations in PVT, which can result in output variations. For example, if Vref increases, the output from charge-pump 502 also increases. However, this type of fluctuation will not affect voltage regulator loop 506 because of the effect of the current mirror 516. Essentially, current mirror 516 functions to convert the variable voltage input, Vref, into a constant current output, Io, thereby enhancing circuit stability.

Voltage regulator loop 506 includes transistors 518 and 526, resistors 520 and 522, and amplifier 524. In one implementation, amplifier 524 is a 2-input amplifier, having as inputs a reference voltage from a voltage source (not shown) and a feedback voltage, which is discussed in greater detail below. Voltage regulator loop 506 is operable to adjust a gate voltage 530 of transistor 518 to provide a constant voltage output 528. Voltage regulator loop 506 includes a feedback loop that is operable to increase or decrease the gate voltage 530 of transistor 518 as a result of changes to the voltage output 528 (so as to adjust the voltage output 528). Voltage regulator loop 506 provided in FIG. 5 is one example of a regulator loop structure. Other regulator loop structures can be provided.

In operation, charge-pump 502 receives a voltage input, Vref, and provides a voltage output of substantially twice Vref. The DC output of charge-pump 502 typically has voltage noise. Current mirror 516 provides a majority of the noise rejection in the noise suppression circuit 504 while a filter, such as bypass capacitor 514, provides additional noise rejection. When active, current mirror 516 provides a constant current output, Io, from the current mirror that matches a reference current, Iref, at the current source 508. Current mirror 516 provides a relatively constant current, Io, over PVT variations.

FIGS. 6a–d illustrate the voltage output graphs for the gate of transistor 518 and for the output voltage 528 as compared with a circuit as shown in FIG. 2 designed to provide the same gate and output voltages. As shown in FIG. 6a, the voltage graph at the gate of transistor 518 illustrates a DC voltage of 2.2V having a voltage ripple of about 1 mV. A comparable circuit without a current mirror (e.g., circuit 200 of FIG. 2) and having a bypass capacitor included within the voltage regulator loop can have a gate voltage ripple of as much as 40 mV (FIG. 6b). As shown in FIG. 6c, the voltage graph for the output voltage 528 illustrates a constant DC voltage of about 1.35 V including a voltage ripple of less than 1 mV. Again, a comparable circuit without a current mirror (e.g., circuit 200 of FIG. 2) can have an output voltage ripple of as much as 4 mV (FIG. 6d). Consequently, the use of the noise suppression circuit 504 can provide increased voltage ripple suppression over the prior art without impacting the stability of other circuit elements such as voltage regulator loop 506.

FIG. 7 illustrates an implementation of a noise suppression circuit 702 in a circuit 700 including multiple voltage regulator loops. Noise suppression circuit 702 includes a bypass capacitor 712 and a multiple output current mirror 714. The multiple output current mirror 714 includes a current source 716 and transistors 718, 720, 722, and 724. Transistors 720, 722, and 724 provide a constant current mirror output, I, that mirrors the reference current, Iref, from current source 716.

In operation, a charge-pump 704 receives a voltage input, Vref, and provides a voltage output of substantially twice Vref. The DC output of charge-pump 704 typically has substantial voltage ripple, which is initially suppressed by the bypass capacitor 712 of the noise suppression circuit 702. When active, current mirror 714 provides a constant current output, I, from each output transistor (i.e., transistors 720, 722, and 724) of the current mirror 714 that matches the reference current, Iref, of the current source 716. The current mirror 714 can be designed to provide relatively constant current output, I, over PVT. Circuit stability is also increased by maintaining a constant current over PVT. The output transistors 720, 722, and 724 provide a constant current to voltage regulator loops 706, 708, and 710 respectively. As with the single output noise suppression circuit described above, each output of the multiple output current mirror 714 further suppresses the voltage ripple at each voltage regulator loop (e.g., voltage regulator loops 706, 708, and 710). Three voltage regulator loops are shown in FIG. 7, however, any number of voltage regulator loops can be included. The number of regulator branches is limited only by the size of the charge-pump. Multiple charge-pumps can be used to increase the supply size as described below with respect to FIG. 8.

FIG. 8 shows another implementation of a noise suppression circuit 802 in a circuit 800 including multiple voltage regulator loops and multiple charge-pumps. A circuit including multiple voltage regulator loops may require multiple charge-pumps in order to supply the required voltage to the voltage regulator loops. Multiple charge-pumps can be coupled in parallel to provide the necessary supply to the voltage regulator loops. Noise suppression circuit 802 includes a bypass capacitor 812 and a multiple output current mirror 814. The multiple output current mirror 814 includes a current source 816 and transistors 818, 820, 822, and 824. Transistors 820, 822, and 824 provide a constant current mirror output, I, that mirrors the current, Iref, from current source 816.

In operation, charge-pumps 826 and 828 provide the supply voltage to the voltage regulator loops 830, 832, and 834 through noise suppression circuit 802. The DC output of each charge-pump 826 and 828 typically has substantial voltage ripple, which is initially suppressed by the bypass capacitor 812 of the noise suppression circuit 802. When active, current mirror 814 maintains a constant (e.g., over PVT variations) current output, I, from each output transistor (i.e., transistors 820, 822, and 824) of the current mirror 814 that matches the reference current, Iref, of the current source 816. The output transistors 820, 822, and 824 provide a constant current to voltage regulator loops 830, 832, and 834 respectively. As with the single output noise suppression circuit 504 described above with respect to FIG. 5, each output of the multiple output current mirror 814 further suppresses the noise at each voltage regulator loop (e.g., voltage regulator loops 830, 832, and 834). Two charge-pumps are shown in FIG. 8, however, any number of charge-pumps can be included to provide the required supply voltage to the voltage regulator loops.

Charge-pumps 410, 502, 704, 826, 828 and noise suppression circuits 420, 504, 702, 802 can be used in a wide range of applications, for example, in an Ethernet transceiver 900 (hereafter referred to as transceiver 900) as shown in FIG. 9. A charge-pump (e.g., charge-pump 410, 502, 704, 826, 828) supplies a reference voltage to a noise suppression circuit (e.g., noise suppression circuit 420, 504, 702, 802). The noise suppression circuit, in response to the supplied reference voltage, can supply a relatively constant current source to a voltage regulator 922. Voltage regulator 922 converts the current source into a reference voltage that can be supplied to each of a receiver 902 and a transmitter 904.

Transceiver 900 can be compliant with IEEE 1000BaseT.

Although only a few implementations have been described in detail above, other modifications are possible. The load circuit is illustrated as a voltage regulator loop, however, other circuit topologies can benefit from reduced noise. For example, other circuits requiring a constant current input can be supported such as a voltage reference generator and a voltage controlled oscillator. The current mirror illustrated as part of the noise suppression circuit is one exemplary current mirror. Other current mirror topologies, which provide a constant current output can be implemented to provide similar effects as disclosed above. The filter provided by the noise suppression circuit is shown as a bypass capacitor. Other filters can be implemented to suppress circuit noise. Since the filter is located outside of the load, for example the voltage regulator loop, the type and size of the filter can vary without impacting load circuit function.

Other implementations may be within the scope of the following claims.

What is claimed:

1. A circuit, comprising:
a charge-pump operable to supply an output voltage;
a current mirror responsive to the output voltage of the charge-pump, and operable to output a relatively constant current and suppress noise from the output voltage; and
a filter arranged between the charge-pump and the current mirror, the filter operable to further suppress noise from the output voltage,
wherein the current mirror is operable to isolate the filter from a load circuit in communication with the current mirror,
the charge-pump is directly coupled to the current mirror, and
the load circuit includes a regulator loop operable to generate a consistent output voltage.

2. A circuit, comprising:
a charge-pump operable to supply an output voltage;
a current mirror responsive to the output voltage of the charge-pump, and operable to output a relatively constant current and suppress noise from the output voltage; and
a filter arranged between the charge-pump and the current mirror, the filter operable to further suppress noise from the output voltage,
wherein the current mirror is operable to isolate the filter from a load circuit in communication with the current mirror,
the charge-pump is directly coupled to the current mirror, and
the load circuit includes a voltage reference generator operable to generate a reference voltage.

3. A circuit, comprising:
a charge-pump operable to supply an output voltage;
a current mirror responsive to the output voltage of the charge-pump, and operable to output a relatively constant current and suppress noise from the output voltage; and
a filter arranged between the charge-pump and the current mirror, the filter operable to further suppress noise from the output voltage,
wherein the current mirror is operable to isolate the filter from a load circuit in communication with the current mirror,
the charge-pump is directly coupled to the current mirror, and
the load circuit includes a voltage controlled oscillator operable to generate an output signal having a predetermined oscillation frequency.

4. A circuit, comprising:
a first charge-pump operable to supply an output voltage; and
a current mirror responsive to the output voltage of the charge-pump, and operable to output a relatively constant current and suppress noise from the output voltage; and
one or more second charge-pumps operable to supply an output voltage,
wherein at least one of the first and second charge-pumps is directly coupled to the current mirror, and
the current mirror is operable to suppress noise from the output voltage of the one or more second charge-pumps.

5. The circuit of claim 4, wherein the current mirror is operable to reject variations in the output voltage of the plurality of charge-pumps.

6. The circuit of claim 4, further comprising:
one or more filters arranged between the plurality of charge-pumps and the current mirror, the one or more filters operable to further suppress noise from the output voltage of the plurality of charge-pumps.

7. The circuit of claim 6, wherein at least one of the one or more filters includes a bypass capacitance.

8. The circuit of claim 7, wherein the bypass capacitance includes a bypass capacitor.

9. The circuit of claim 4, further comprising:
a plurality of current mirrors, each current mirror operable to provide a constant current to a corresponding load circuit and suppress noise from a corresponding output voltage of one or more of the first charge-pump or one or more of the second charge-pumps.

10. The circuit of claim 9, wherein at least one of the plurality of load circuits includes a regulator loop operable to generate a consistent output voltage.

11. The circuit of claim 9, wherein at least one of the plurality of load circuits includes a voltage reference generator operable to generate a reference voltage.

12. The circuit of claim 9, wherein at least one of the plurality of load circuits includes a voltage controlled oscillator operable to generate an output signal having a predetermined oscillation frequency.

13. A circuit, comprising:
supply means for supplying an output voltage;
suppression means for suppressing noise from the supplied output voltage and converting the supplied output voltage into a relatively constant current; and
filtering means arranged between the supply means and the suppression means, the filtering means for further suppressing noise from the supplied output voltage,
wherein the suppression means isolates the filtering means from a loading means in communication with the suppression means,
the supply means is directly coupled to the suppression means, and
the loading means includes a regulator loop means for generating a consistent output voltage.

14. A circuit comprising:
supply means for supplying an output voltage;

suppression means for suppressing noise from the supplied output voltage and converting the supplied output voltage into a relatively constant current; and filtering means arranged between the supply means and the suppression means, the filtering means for further suppressing noise from the supplied output voltage, wherein the suppression means isolates the filtering means from a loading means in communication with the suppression means, the supply means is directly coupled to the suppression means, and the loading means includes a voltage reference generator means for generating a reference voltage.

15. A circuit, comprising:

supply means for supplying an output voltage;

suppression means for suppressing noise from the supplied output voltage and converting the supplied output voltage into a relatively constant current; and filtering means arranged between the supply means and the suppression means, the filtering means for further suppressing noise from the supplied output voltage, wherein the suppression means isolates the filtering means from a loading means in communication with the suppression means, the supply means is directly coupled to the suppression means, and the loading means includes a voltage controlled oscillator means for generating an output signal having a pre-determined oscillation frequency.

16. A circuit, comprising:

supply means for supplying an output voltage; and suppression means for suppressing noise from the supplied output voltage and converting the supplied output voltage into a relatively constant current, wherein the supply means includes a plurality of charge-pump means, the supply means being directly coupled to the suppression means.

17. The circuit of claim 16, wherein the suppression means rejects voltage variations from an output voltage of the plurality of change-pump means.

18. The circuit of claim 16, further comprising:

a filtering means including one or more filter means arranged between the plurality of charge-pump means and the suppression means, the one or more filter means for further suppressing noise from the output voltage of the plurality of charge-pump means.

19. The circuit of claim 18, wherein at least one of the one or more filter means includes a bypass capacitance means.

20. The circuit of claim 19, wherein the bypass capacitance means includes a bypass capacitor means.

21. The circuit of claim 16, wherein the suppression means includes a plurality of current mirror means in communication with a plurality of loading means, each current mirror means for providing a relatively constant current source to a corresponding loading means and suppressing noise from an output voltage of a corresponding charge-pump means.

22. The circuit of claim 21, wherein the plurality of loading means includes a plurality of regulator loop means for generating a consistent output voltage.

23. The circuit of claim 21, wherein the plurality of loading means includes a plurality of voltage reference generator means for generating a reference voltage.

24. The circuit of claim 21, wherein the plurality of loading means includes a plurality of voltage controlled oscillator means for generating an output signal having a pre-determined oscillation frequency.

25. A method of suppressing noise, comprising:

providing an output voltage with a supply apparatus having an associated noise component;

suppressing the noise component with a suppression apparatus in the output voltage including supplying a relatively constant current in response to the output voltage and including directly coupling the supply apparatus with the suppression apparatus;

filtering the output voltage with a filter apparatus to further suppress the noise component; and isolating the filter apparatus from a load circuit receiving the relatively constant current source, wherein isolating the filter apparatus includes isolating the filter apparatus from a regulator loop operable to generate a consistent output voltage.

26. A method of suppressing noise, comprising:

providing an output voltage with a supply apparatus having an associated noise component;

suppressing the noise component with a suppression apparatus in the output voltage including supplying a relatively constant current in response to the output voltage and including directly coupling the supply apparatus with the suppression apparatus;

filtering the output voltage with a filter apparatus to further suppress the noise component; and isolating the filter apparatus from a load circuit receiving the relatively constant current source, wherein isolating the filter apparatus includes isolating the filter apparatus from a voltage reference generator operable to generate a reference voltage.

27. A method of suppressing noise, comprising:

providing an output voltage with a supply apparatus having an associated noise component;

suppressing the noise component with a suppression apparatus in the output voltage including supplying a relatively constant current in response to the output voltage and including directly coupling the supply apparatus with the suppression apparatus;

filtering the output voltage with a filter apparatus to further suppress the noise component; and isolating the filter apparatus from a load circuit receiving the relatively constant current source, wherein isolating the filter apparatus includes isolating the filter apparatus from a voltage controlled oscillator operable to generate an output signal having a pre-determined oscillation frequency.

28. A method of suppressing noise, comprising:

providing an output voltage having an associated noise component by using a supply apparatus;

suppressing the noise component in the output voltage including supplying a relatively constant current in response to the output voltage by using a suppression apparatus directly coupled to the supply apparatus; and providing the output voltage to a load circuit from a plurality of charge-pumps, and suppressing noise from the output voltage of the plurality of charge-pumps.

29. The method of claim 28, wherein suppressing the noise component includes rejecting variations in the output voltage of the plurality of charge-pumps.

30. The method of claim 29, further comprising:

filtering the output voltage to suppress noise including providing a plurality of filters arranged between the plurality of charge-pumps and a current mirror.

31. The method of claim 30, wherein filtering the output voltage to suppress noise includes providing a bypass capacitance.

32. The method of claim 31, wherein providing a bypass capacitance includes providing a plurality of bypass capacitors.

33. The method of claim 28, further comprising:
suppressing a noise component in the output voltage including providing a plurality of current mirrors that are operable to supply the relatively constant current to a plurality of load circuits.

34. The method of claim 33, wherein:
supplying the relatively constant current includes supplying the relatively constant current to a plurality of regulator loops, each regulator loop operable to generate a consistent output voltage.

35. The method of claim 33, wherein:
supplying the relatively constant current includes supplying the relatively constant current to a plurality of voltage reference generators, each voltage reference generator operable to generate a reference voltage.

36. The method of claim 33, further comprising:
supplying the relatively constant current includes supplying the relatively constant current to a plurality of voltage controlled oscillators, each voltage controlled oscillator operable to generate an output signal having a pre determined oscillation frequency.

37. An Ethernet transceiver, comprising:
a transmitter;
a receiver;
a charge-pump operable to supply an output voltage to a current mirror;
the current mirror arranged between the charge-pump and a voltage regulator and being directly coupled to the charge-pump, the current mirror operable to supply a relatively constant current to the voltage regulator and suppress noise from the output voltage of the charge-pump; and
the voltage regulator further in communication with at least one of the transmitter and the receiver, the voltage regulator operable to provide a relatively constant voltage to the at least one of the transmitter and the receiver.

38. The Ethernet transceiver of claim 37, further comprising:
a filter arranged between the charge-pump and the current mirror, the filter operable to further suppress noise from the output voltage of the charge-pump.

39. The Ethernet transceiver of claim 38, wherein the filter includes a bypass capacitance.

40. The Ethernet transceiver of claim 39, wherein the bypass capacitance includes a bypass capacitor.

41. The Ethernet transceiver of claim 38, wherein the current mirror is operable to isolate the filter from the voltage regulator.

42. The Ethernet transceiver of claim 41, wherein the voltage regulator includes a regulator loop operable to generate a consistent output voltage.

43. The Ethernet transceiver of claim 41, wherein the voltage regulator includes a voltage reference generator operable to generate a reference voltage.

44. The Ethernet transceiver of claim 41, wherein the voltage regulator includes a voltage controlled oscillator operable to generate an output signal having a pre-determined oscillation frequency.

45. The Ethernet transceiver of claim 37, wherein the current mirror is operable to reject variations in the output voltage of the charge-pump.

46. The Ethernet transceiver of claim 37, further comprising:
a plurality of charge-pumps operable to supply an output voltage, the current mirror operable to suppress noise from the output voltage of the plurality of charge-pumps.

47. The Ethernet transceiver of claim 46, further comprising:
one or more filters arranged between the plurality of charge-pumps and the current mirror, the one or more filters operable to further suppress noise from the output voltage of the plurality of charge-pumps.

48. The Ethernet transceiver of claim 47, wherein at least one of the one or more filters includes a bypass capacitance.

49. The Ethernet transceiver of claim 48, wherein the bypass capacitance includes a bypass capacitor.

50. The Ethernet transceiver of claim 46, wherein the current mirror is operable to reject variations in the output voltage of the plurality of charge-pumps.

51. The Ethernet transceiver of claim 37, wherein the Ethernet transceiver is compliant with IEEE 1000BaseT.

52. An Ethernet transceiver, comprising:
transmitter means for transmitting a signal;
receiver means for receiving a signal; and
supply means for supplying an output voltage to a noise suppression means, the noise suppression means for suppressing noise from the supplied output voltage and converting the supplied output voltage into a relatively constant current, and supplying the relatively constant current to a loading means,
wherein the noise suppression means comprises:
filtering means for further suppressing noise from the supplied output voltage,
wherein noise suppression means isolates the filtering means from the loading means,
the supply means is directly coupled to the noise suppression means, and
the loading means includes a regulator loop means for generating a consistent output voltage.

53. An Ethernet transceiver, comprising:
transmitter means for transmitting a signal;
receiver means for receiving a signal; and
supply means for supplying an output voltage to a noise suppression means, the noise suppression means for suppressing noise from the supplied output voltage and converting the supplied output voltage into a relatively constant current, and supplying the relatively constant current to a loading means,
wherein the noise suppression means comprises:
filtering means for further suppressing noise from the supplied output voltage,
wherein noise suppression means isolates the filtering means from the loading means,
the supply means is directly coupled to the noise suppression means, and
the loading means includes a voltage reference generator means for generating a reference voltage.

54. An Ethernet transceiver, comprising:
transmitter means for transmitting a signal;
receiver means for receiving a signal; and
supply means for supplying an output voltage to a noise suppression means, the noise suppression means for suppressing noise from the supplied output voltage and converting the supplied output voltage into a relatively constant current, and supplying the relatively constant current to a loading means,
wherein the noise suppression means comprises:
filtering means for further suppressing noise from the supplied output voltage, wherein noise suppression means isolates the filtering means from the loading means, the supply means is directly coupled to the noise suppression means, and the loading means includes a voltage controlled oscillator means for generating an output signal having a predetermined oscillation frequency.

55. An Ethernet transceiver, comprising:

transmitter means for transmitting a signal;

receiver means for receiving a signal; and supply means for supplying an output voltage to a noise suppression means, the noise suppression means for suppressing noise from the supplied output voltage and converting the supplied output voltage into a relatively constant current, and supplying the relatively constant current to a loading means, wherein the supply means includes a plurality of charge-pump means, and the supply means is directly coupled to the noise suppression means.

56. The Ethernet transceiver of claim 55, wherein the noise suppression means further includes:

a filtering means including one or more filter means in communication with the plurality of charge-pump means, the one or more filter means operable to suppress noise from an voltage output of the plurality of charge-pump means.

57. The Ethernet transceiver of claim 56, wherein at least one of the one or more filter means includes a bypass capacitance means.

58. The Ethernet transceiver of claim 57, wherein the bypass capacitance means includes a bypass capacitor means.

59. The Ethernet transceiver of claim 55, wherein the noise suppression means rejects voltage variations from the output of the plurality of charge-pump means.

60. An Ethernet transceiver, comprising:

transmitter means for transmitting a signal;

receiver means for receiving a signal; and supply means for supplying an output voltage to a noise suppression means, the noise suppression means for suppressing noise from the supplied output voltage and converting the supplied output voltage into a relatively constant current, and supplying the relatively constant current to a loading means, wherein the Ethernet transceiver is compliant with IEEE 1000BaseT, and the supply means is directly coupled to the noise suppression means.

* * * * *